A. KESSEL.
NUT LOCK.
APPLICATION FILED SEPT. 23, 1914.

1,177,780.

Patented Apr. 4, 1916.

Witnesses
C. C. Faunce
John J. McCarthy

Inventor
Albert Kessel

By Victor J. Evans
Attorney

UNITED STATES PATENT OFFICE.

ALBERT KESSEL, OF MARRIOTT, SASKATCHEWAN, CANADA.

NUT-LOCK.

1,177,780. Specification of Letters Patent. Patented Apr. 4, 1916.

Application filed September 23, 1914. Serial No. 863,224.

*To all whom it may concern:*

Be it known that I, ALBERT KESSEL, a citizen of Canada, residing at Marriott, in the Province of Saskatchewan and Dominion of Canada, have invented new and useful Improvements in Nut-Locks, of which the following is a specification.

This invention relates to certain novel and useful improvements in nut locks.

In carrying out the present invention, it is my purpose to provide a nut lock whereby the nut and bolt will be effectively and securely locked to each other against accidental relative movement and whereby the nut may be locked to the bolt rapidly and quickly.

With the above and other objects in view, the invention consists in the construction, combination and arrangement of parts hereinafter set forth in and falling within the scope of the claim.

Figure 1:
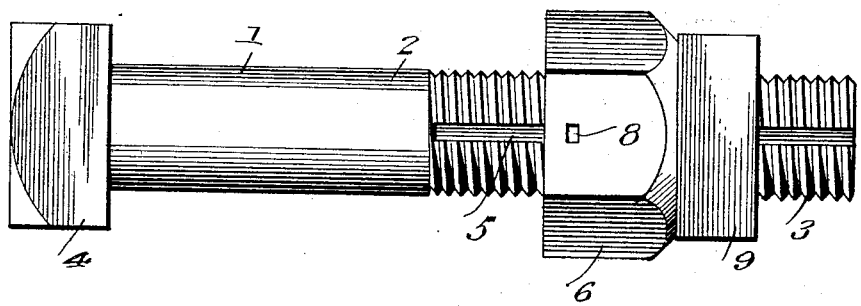
Figure 2:
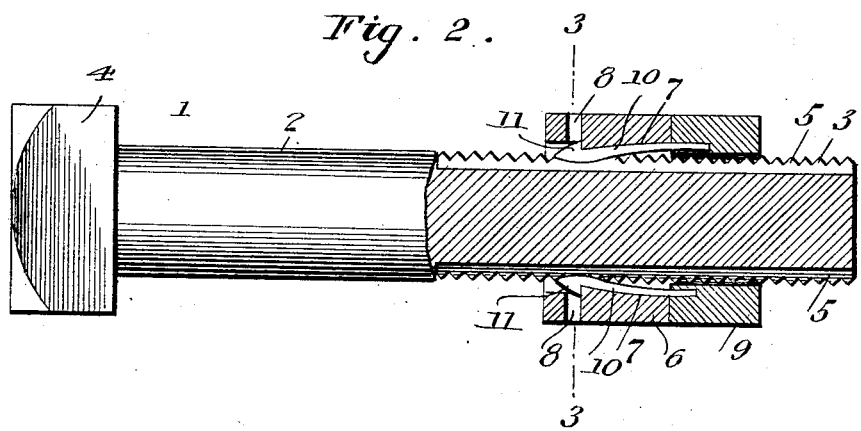
Figure 3:
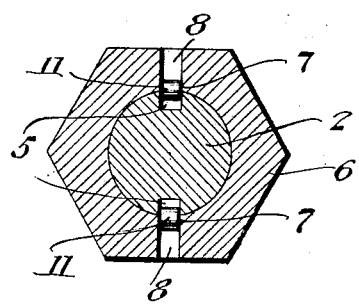
Figure 4:
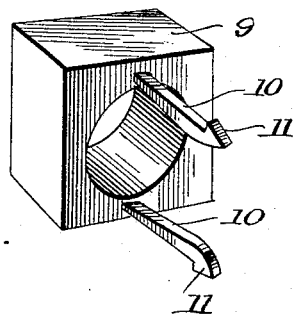

In the accompanying drawing, Figure 1 is a view in side elevation of a bolt and nut thereon equipped with a locking device constructed in accordance with the present invention. Fig. 2 is a longitudinal sectional view through the same. Fig. 3 is a transverse sectional view thereof. Fig. 4 is a perspective view of the locking device removed.

Referring now to the drawing in detail, 1 designates a bolt comprising a shank 2 having one end threaded as at 3 and the opposite end equipped with a head 4. Formed in the shank 2 of the bolt at diametrically opposite points are longitudinally extending grooves 5 along the threaded end of the bolt. A nut 6 is designed to threadedly engage the stem of the bolt and formed in the bore of the nut at diametrically opposite points are longitudinal grooves 7, 7 adapted to register with the grooves 5 respectively in the shank of the bolt, while formed in the opposite sides of the nut adjacent to the inner end thereof and communicating with the grooves 7, 7 are apertures 8.

9 designates a collar adapted to be passed over the stem of the bolt succeeding the application of the nut thereto and formed on one end of the collar 9 at diametrically opposite points of the bore therein are spring fingers 10 projecting outwardly from the adjacent face of the collar parallel with the axis thereof and having the outer surfaces at the free extremities thereof formed with noses 11.

In practice, the nut is threaded onto the shank of the bolt, to the desired extent and the grooves 7, 7 in the bore of the nut brought into registration with the grooves 5 in the shank of the bolt. The collar 9 is now slipped over the outer end of the bolt shank and the fingers 10 passed into the alining grooves 5 and 7 so that the noses 11 ride into the apertures 8 thereby locking the collar to the nut, while the fingers 10 in the alining grooves serve to prevent rotation of the nut on the bolt. To remove the nut from the bolt, a suitable instrument is employed whereby the nose ends of the fingers 10 are depressed so that the noses will be free of the walls of the apertures 8 whereby the collar may be withdrawn from the bolt.

I claim:

In a nut lock, the combination with a bolt having longitudinal grooves formed in the shank thereof at diametrically opposite points, a nut adapted to threadedly engage said shank and having grooves formed in the bore thereof at diametrically opposite points to register with the first grooves and provided with apertures in the opposite sides thereof communicating with the inner ends of the grooves therein, a collar adapted to encircle the projecting end of the bolt, spring fingers on one end of said collar at diametrically opposite points and adapted to enter the registering grooves in the bolt and nut to hold the nut against rotation on the bolt, and noses formed on the outer surfaces of said fingers at the free extremities thereof to engage in the apertures in said nut whereby the collar is locked to the nut.

In testimony whereof I affix my signature in presence of two witnesses.

ALBERT KESSEL.

Witnesses:
G. A. LE REW,
LOUISE DRYSDALE.

Copies of this patent may be obtained for five cents each, by addressing the "Commissioner of Patents, Washington, D. C."